United States Patent
Ha et al.

(10) Patent No.: US 11,425,236 B2
(45) Date of Patent: Aug. 23, 2022

(54) MOBILE TERMINAL

(71) Applicant: LG ELECTRONICS INC., Seoul (KR)

(72) Inventors: Myungjin Ha, Seoul (KR); Byeongkil Kang, Seoul (KR); Gijae Yi, Seoul (KR); Jongpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/902,638

(22) Filed: Jun. 16, 2020

(65) Prior Publication Data

US 2021/0266387 A1 Aug. 26, 2021

(30) Foreign Application Priority Data

Feb. 21, 2020 (KR) .................. 10-2020-0021786

(51) Int. Cl.
*H04M 1/02* (2006.01)
*H04N 5/225* (2006.01)
*H04N 9/09* (2006.01)
*H04N 13/243* (2018.01)
*H04N 13/25* (2018.01)
*H04N 5/247* (2006.01)

(52) U.S. Cl.
CPC ........ *H04M 1/0264* (2013.01); *H04N 5/2252* (2013.01); *H04N 5/247* (2013.01); *H04N 9/09* (2013.01); *H04N 13/243* (2018.05); *H04N 13/25* (2018.05)

(58) Field of Classification Search
CPC ... H04M 1/0264; H04N 13/25; H04N 13/243; H04N 5/2252; H04N 5/247; H04N 9/09
See application file for complete search history.

(56) References Cited

U.S. PATENT DOCUMENTS

| 9,683,834 | B2 * | 6/2017 | Hsin ..................... H04N 5/232 |
| 10,491,883 | B2 | 11/2019 | Chang | |
| 2004/0105580 | A1 * | 6/2004 | Hager ..................... G06T 7/596 |
| | | | 382/154 |

(Continued)

FOREIGN PATENT DOCUMENTS

| CN | 108377378 | 8/2018 |
| CN | 110009672 | 7/2019 |

(Continued)

OTHER PUBLICATIONS

9to5Mac, Nov. 11, 2019, "https://web.archive.org/web/20191112013344/ https://9to5mac.com/2019/11/11/iphone-12-renders/", pp. 1-5.*

(Continued)

*Primary Examiner* — Junpeng Chen
(74) *Attorney, Agent, or Firm* — Lee Hong Degerman Kang & Waimey

(57) ABSTRACT

Provided is a mobile terminal including a plurality of cameras to minimize an occurrence of occlusion, wherein the first lens part, the second lens part, and the ToF lens part are provided on one surface of the body to be exposed outside, the first holder, the second holder, and the ToF holder each have a rectangular transverse-section, and the first holder, the second holder, and the ToF holder are arranged such that the ToF lens part is located between the first lens part and the second lens part.

20 Claims, 11 Drawing Sheets

(56) References Cited

U.S. PATENT DOCUMENTS

| | | | | |
|---|---|---|---|---|
| 2010/0309292 | A1* | 12/2010 | Ho | H04N 13/261 |
| | | | | 348/47 |
| 2016/0191769 | A1* | 6/2016 | Yeh | H04N 5/2257 |
| | | | | 348/47 |
| 2017/0339329 | A1* | 11/2017 | Lee | H04N 5/23216 |
| 2018/0131923 | A1* | 5/2018 | Chang | H04N 13/257 |
| 2019/0041909 | A1* | 2/2019 | Pakula | H04M 1/0202 |
| 2019/0082083 | A1* | 3/2019 | Jarvis | H04N 5/2256 |
| 2019/0289278 | A1* | 9/2019 | Yeh | G01S 17/86 |
| 2019/0311180 | A1* | 10/2019 | Tang | H04N 5/2253 |
| 2020/0128225 | A1* | 4/2020 | Ge | G06K 9/6289 |
| 2021/0168231 | A1* | 6/2021 | Baker | H04M 1/0206 |

FOREIGN PATENT DOCUMENTS

| | | |
|---|---|---|
| EP | 3404910 | 11/2018 |
| JP | 2018-196107 | 12/2018 |
| KR | 10-2009-0055803 | 6/2009 |

OTHER PUBLICATIONS

PCT International Application No. PCT/KR2020/006559, International Search Report dated Nov. 17, 2020, 4 pages.

* cited by examiner

MOBILE TERMINAL

CROSS-REFERENCE TO RELATED APPLICATION

Pursuant to 35 U.S.C. § 119(a), this application claims the benefit of earlier filing date and right of priority to Korean Patent Application No. 10-2020-0021786, filed on Feb. 21, 2020, the contents of which are all hereby incorporated by reference herein in its entirety.

BACKGROUND

1. Field

This disclosure relates to a mobile terminal including a plurality of cameras.

2. Description of the Related Art

Terminals may be classified into mobile or portable terminals and stationary terminals based on whether to be moved. The mobile terminals may be classified into handheld terminals and vehicle-mounted terminals based on whether to be carried by a user.

Functions of the mobile terminal have been diversified. For example, the mobile terminal may have functions of data and voice communication, image and video shooting through a camera, voice recording, playing a music file through a speaker system, and outputting an image or video on a display. In some terminals, a game playing function is added or a multimedia player function is performed. A recent mobile terminal may receive a multicast signal that provides visual contents such as broadcast, video, or television programs.

According to the diversification in functions, the terminal is implemented in a form of a multimedia player having various functions such as taking a picture or video, playing music or video files, playing a game, receiving broadcasts, and the like.

In order to support and develop the functions of the terminal, it may be considered to improve a structural part and/or software part of the terminal.

A camera field has been consistently required to be improved and is currently being developed to meet this purpose. A camera included in the mobile terminal may have a high-quality and a high-speed performance and also be required to have a small size. In particular, the mobile terminal may often be restricted on a space in a thickness direction of a device, so that a thickness of the camera is also limited.

In the past, it has been focused on how to provide an RGB image acquired by a single RGB camera with increased clearness. Recently, in contrast, it is focused on acquiring various types of images based on a region of an object or a property of the object.

To satisfy recent requirements and constraints, the mobile terminal may often include a plurality of cameras having different angles of view. Recently, a camera for sensing a shape of an object is also provided in the mobile terminal. Such camera is defined as a shape camera below. Also, an image acquired by the shape camera is defined as a shape image.

The shape camera may include, for example, a time-of-flight (ToF) camera and a structured light (SL) camera. The ToF camera may acquire a shape image using data based on a time for which an emitted wave is reflected and returned from an object. The SL camera may acquire a shape image using data based on a distortion of a pattern reflected at an object.

The shape image may be used through a synthesis with an RGB image.

The synthesized image may provide more accurate information to understand a presence or shape of an object and thus, be highly applicable.

In addition, a plurality of RGB images acquired at various angles of views may be used in combination with each other.

Even if the same object is captured by a plurality of cameras, images of the exactly same shape may not be acquired due to a difference in positions of the cameras. A portion in which an error occurs due to a disparity of two cameras when synthesizing an RGB image and a shape image is referred to as an occlusion.

SUMMARY

An aspect is to minimize an occurrence of occlusion in a mobile terminal including a plurality of cameras.

Another aspect is to minimize a space occupied by a camera, thereby improving a spatial efficiency of a mobile terminal.

According to an aspect, there is provided a mobile terminal including a body configured to form an appearance, a first red-green-blue (RGB) camera, a second RGB camera, and a time-of-flight (ToF) camera. The first RGB camera, the second RGB camera, and the ToF camera are mounted on the body. The first RGB camera includes a first lens part configured to receive light and a first holder configured to mount the first lens part. The second RGB camera includes a second lens part configured to receive light and a second holder configured to mount the second lens part. The ToF camera includes a ToF lens part configured to receive light emitted from a light emitting part and reflected from an object and a ToF holder configured to mount the ToF lens part. The first lens part, the second lens part, and the ToF lens part are provided on one surface of the body to be exposed outside. The first holder, the second holder, and the ToF holder each have a rectangular transverse-section. The first holder, the second holder, and the ToF holder are arranged such that the ToF lens part is located between the first lens part and the second lens part.

A center of the first lens part, a center of the ToF lens part, and a center of the second lens part may be on one straight line based on the one surface of the body.

An arrangement direction of the first holder, the ToF holder, and the second holder may be vertical to an arrangement direction of the light emitting part and the ToF lens part based on the one surface of the body.

The first holder and the second holder may be arranged on a diagonal line such that one corner of the first holder and one corner of the second holder face each other. Two neighboring edges of the ToF holder may be positioned to respectively face one edge of the first holder and one edge of the second holder based on the one surface of the body.

One edge of the second holder and one edge of the ToF holder may be positioned to simultaneously face one edge of the first holder. Another edge of the second holder adjoining with the one edge of the second holder and another edge of the ToF holder adjoining with the one edge of the ToF holder may be positioned to face each other based on the one surface of the body.

At least one of a first base line connecting a center of the first lens part and a center of the ToF lens part and a second base line connecting a center of the second lens part and the center of the ToF lens part may intersect vertically one edge of the ToF holder based on the one surface of the body.

The first holder may be greater in size than the second holder. The first base line may intersect vertically with one edge of the ToF holder based on the one surface of the body.

The mobile terminal may further include a third RGB camera configured to be mounted on the body, a third lens part included in the third RGB camera to receive light, and a third holder configured to mount the third lens part included in the third RGB camera. Three edges of the ToF holder may be positioned to respectively face edges of the first holder, the second holder, and the third holder based on the one surface of the body.

At least one of a first base line connecting a center of the first lens part and a center of the ToF lens part, a second base line connecting a center of the second lens part and the center of the ToF lens part, and a third base line connecting a center of the third lens part and the center of the ToF lens part may intersect vertically with one edge of the ToF holder based on the one surface of the body.

The third holder may be greater in size than the first holder and the second holder. One edge of the first holder and one edge of the second holder may be positioned to respectively face edges of both sides of the ToF holder. The third base line may intersects vertically with one edge of the ToF holder based on the one surface of the body.

The mobile terminal may further include a first printed circuit board (PCB) on which the first RGB camera is mounted and a second PCB on which the ToF camera is mounted. The second PCB may be disposed above the first PCB based on a thickness direction of the body.

A front surface of the first lens part or the second lens part and a front surface of the ToF lens part may be on a same surface.

When the second PCB forms an overlapping area in which at least one area of the second PCB is included in the first PCB based on the one surface of the body, the mobile terminal may further include a vertical partition configured to vertically connect the first PCB and the second PCB in the overlapping area and a via formed in the vertical partition to electrically connect the first PCB and the second PCB.

At least one area of the ToF holder may overlap at least one of the first holder and the second holder based on the one surface of the body.

A height of a front surface of the second holder may be less than a height of a front surface of the first holder based on a thickness direction of the body. At least one area of a rear surface of the second PCB may support the front surface of the second holder.

The second holder may include an extended portion that extends in a horizontal direction to support the rear surface of the ToF holder.

At least one area of the rear surface of the second PCB may support the front surfaces of the first holder and the second holder. A reinforcement plate may be provided on the rear surface of the second PCB to compensate for a difference in height between the first holder and the second holder.

At least a portion of a rear surface of the reinforcement plate may support the front surface of the second holder. At least a portion of a side surface of the reinforcement plate may support a side surface of the first holder.

When the second PCB forms an overlapping area in which at least one area of the second PCB is included in the first PCB based on the one surface of the body, the mobile terminal may further include a vertical partition configured to vertically connect the first PCB and the second PCB in the overlapping area and a via formed in the vertical partition to electrically connect the first PCB and the second PCB.

The vertical partition is provided as a plurality of partitions, and at least a portion of the vertical partitions are shifted in a predetermined distance from an outer perimeter area of the rear surface of the second PCB.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
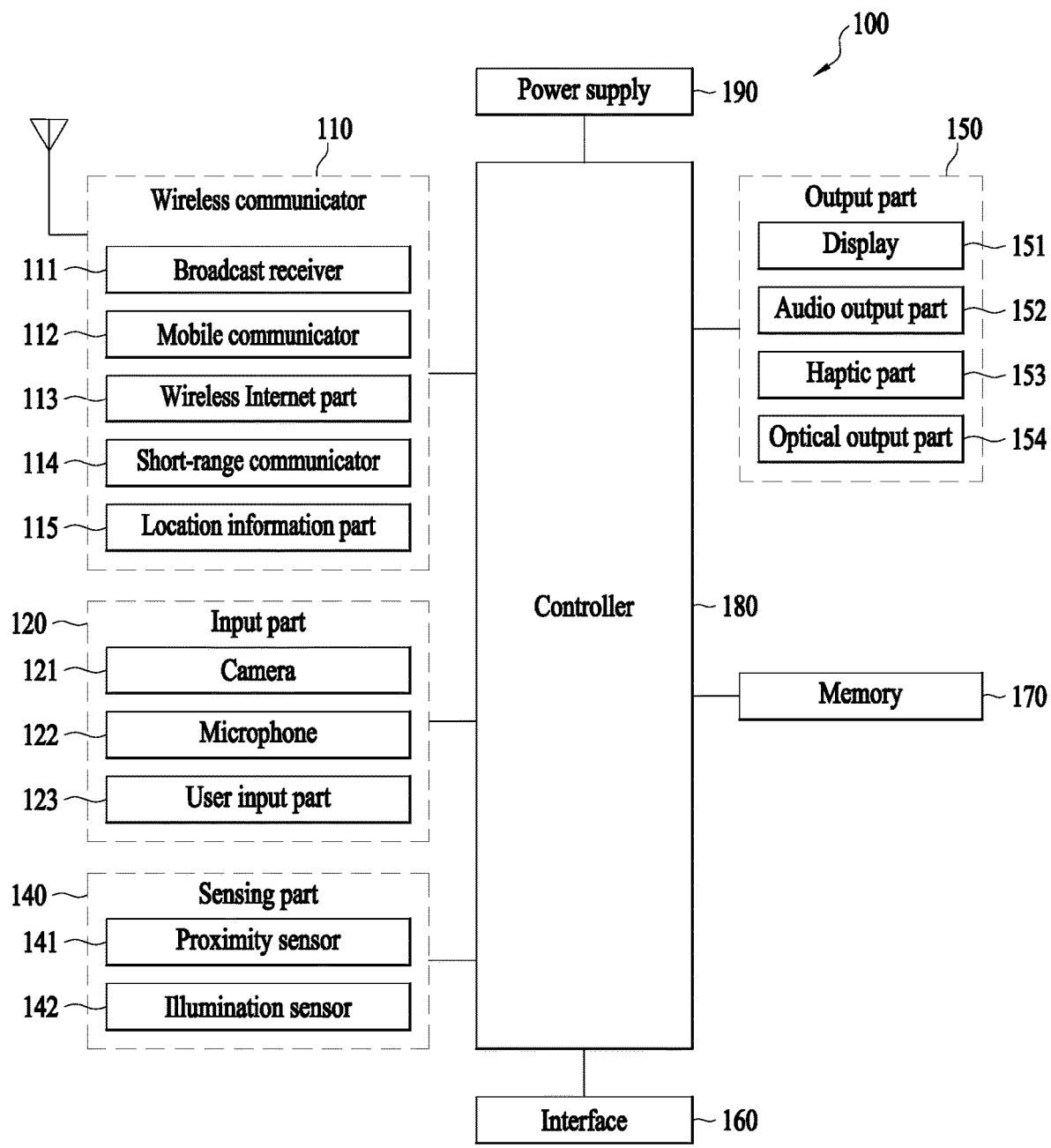
FIG. 1 is a block diagram illustrating a mobile terminal according to the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Mobile terminals described herein include mobile phones, smart phones, laptop computers, digital broadcasting terminals, personal digital assistants (PDAs), portable multimedia players (Pumps), navigation, and slate PCs. Tablet PC (tablet PC), ultrabook, wearable device (for example, a watch-type terminal (smartwatch), glass-type terminal (smart glass), HMD (head mounted display), etc. may be included.

However, the configuration according to the embodiment described in the present specification may be applied to a fixed terminal such as a digital TV, a desktop computer, and a digital signage, except when applicable only to a mobile terminal. It is easy for a technician to know.

Figure 2A:
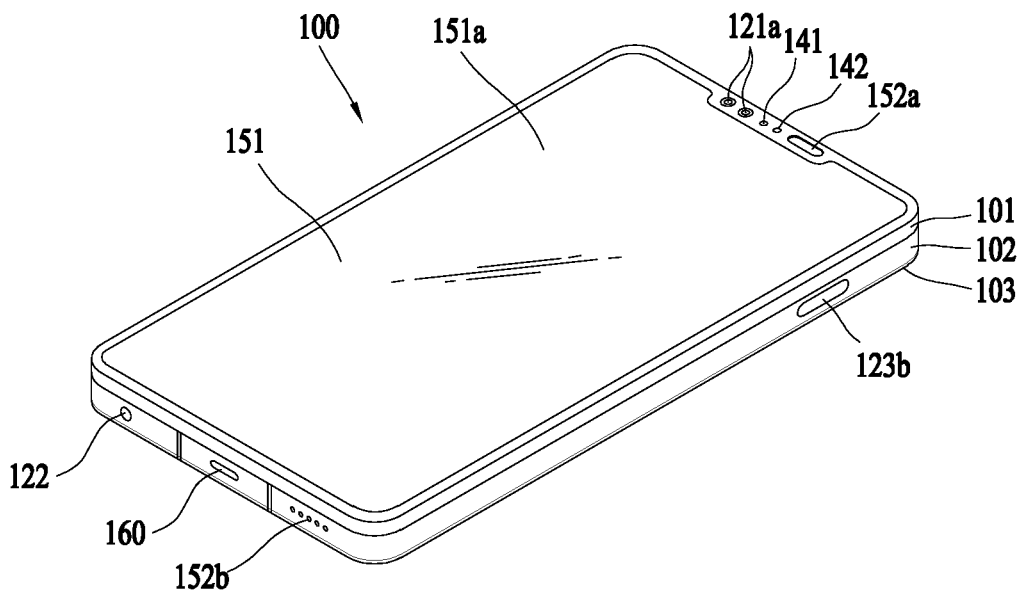
FIGS. 2A and 2B illustrate a mobile terminal viewed in different directions according to the present disclosure.
Figure 2B:
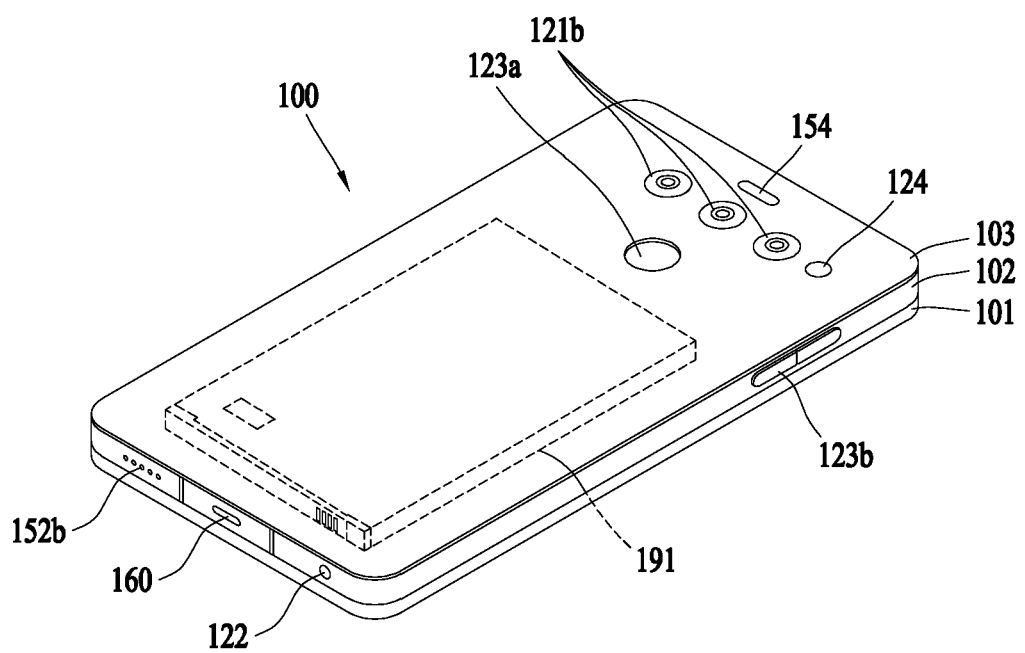

Referring to FIG. 1, FIG. 2A, and FIG. 2B, FIG. 1 is a block diagram illustrating a mobile terminal 100 related to the present invention, and FIGS. 2A and 2B are views of an example of a mobile terminal 100 related to the present invention viewed from different directions.

The mobile terminal 100 may include a wireless communicator 110, an input part 120, a sensing part 140, an output part 150, an interface 160, a memory 170, a controller 180, and a power supply 190. It is understood that implementing all of the components illustrated in FIG. 1 is not a requirement, and that greater or fewer components may alternatively be implemented.

More specifically, the wireless communicator 110 may include one or more modules which enable communications such as wireless communications between the mobile terminal 100 and a wireless communication system, communications between the mobile terminal 100 and another mobile terminal 100, communications between the mobile terminal 100 and an external server. Further, the wireless communicator 110 typically includes one or more modules which connect the mobile terminal 100 to one or more networks.

The wireless communicator 110 may include one or more of a broadcast receiver 111, a mobile communicator 112, a wireless Internet part 113, a short-range communicator 114, and a location information part 115.

The input part 120 may include a camera 121 for obtaining images or video or an image input part, a microphone 122 for inputting an audio signal or an audio input part, a user input part 123 (for example, a touch key, a push key, and the like) for allowing a user to input information, and the like. Voice data or image data collected by the input part 120 may be analyzed and processed into a user's control command.

The sensing part 140 may include one or more sensors configured to sense at least one of internal information of the mobile terminal 100, the surrounding environment of the mobile terminal 100, or user information. For example, the sensing part 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 121), a microphone (for example, the microphone 122), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from two or more sensors of the aforementioned sensors, and combinations thereof.

The output part 150 is configured to generate various types of output, such as audio, video, tactile output, and the like. The display 151 may be inter-layered with or integrally formed with a touch sensor to facilitate a touch screen. Such a touch screen may provide an output interface between the mobile terminal 100 and a user, as well as function as the user input part 123 which provides an input interface between the mobile terminal 100 and the user.

The interface 160 serves as an interface with various types of external devices that can be coupled to the mobile terminal 100. The interface 160 may include, for example, at least one of a wired or wireless port, an external power supply port, a wired or wireless data port, a memory card port, a port for connecting a device having an identification module, an audio input/output (I/O) port, a video I/O port, or an earphone port. In some cases, the mobile terminal 100 may perform assorted control functions associated with a connected external device, in response to the external device being connected to the interface 160.

The memory 170 stores data to support various functions or features of the mobile terminal 100. For instance, the memory 170 may be configured to store application programs executed in the mobile terminal 100, data or instructions for operations of the mobile terminal 100, and the like. At least some of the application programs may be downloaded from an external server via wireless communication. At least some of the application programs may be installed within the mobile terminal 100 at time of manufacturing or shipping, which is typically the case for basic functions of the mobile terminal 100 (for example, receiving a call, placing a call, receiving a message, sending a message, and the like). Meanwhile, application programs may be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs stored in the memory 170, thereby processing or providing appropriate information and/or functions to a user.

In order to execute application programs stored in the memory 170, the controller 180 may control at least some of the above-described components described with reference to FIG. 1. Further, in order to execute application programs stored in the memory 170, the controller 180 may control at least two or more of the components included in the mobile terminal 100 in combination.

Under the control of the controller 180, the power supply 190 receives external power or internal power or provide power to each component included in the mobile terminal 100. The power supply 190 may include a battery, and the battery may be an embedded battery or a replaceable battery.

The power supply 190 may be connected with a power supply port, the power supply port may be configured as an example of the interface 160 to which an external charger for supplying power is electrically connected to charge a battery.

At least one portion of the respective components mentioned in the foregoing description can cooperatively operate to implement operations, controls or controlling methods of the mobile terminal 100 according to various embodiments of the present disclosure mentioned in the following description. Moreover, the operations, controls or controlling methods of the mobile terminal 100 can be implemented in the mobile terminal upon execution of at least one or more application programs stored in the memory 170.

The input unit 120 is for input of image information (or signals), audio information (or signals), data, or information input from a user. For input of image information, the mobile terminal 100 may include one or more camera 121. The camera 121 processes image frames such as still images or moving pictures obtained by an image sensor in a video call mode or a shooting mode. The processed image frame may be displayed on the display unit 151 or stored in the memory 170. Meanwhile, the plurality of cameras 121 provided in the mobile terminal 100 may be arranged to form a matrix structure, and through the plurality of cameras 121 forming the matrix structure, a plurality of image information having various angles or focuses may be input. Also, the plurality of cameras 121 may be arranged in a stereo structure to acquire left and right images for realizing a stereoscopic image.

The camera 121 of the input unit 120 includes at least one of a camera sensor (e.g., CCD, CMOS, etc.), a photo sensor (or image sensor), and a laser sensor.

The camera 121 and the laser sensor may be combined with each other to detect a touch of a sensing target for a 3D stereoscopic image. The photo sensor may be stacked on the display element, which is configured to scan the movement of the sensing object close to the touch screen. More specifically, the photo sensor mounts photo diodes and TRs (transistors) in rows/columns to scan the contents placed on the photo sensor using electrical signals that change according to the amount of light applied to the photo diode. That is, the photo sensor performs coordinate calculation of the sensing object according to the change amount of light, and through this, location information of the sensing object may be obtained.

Referring to FIGS. 2A and 2B, the disclosed mobile terminal 100 has a bar-shaped terminal body. However, the present invention is not limited to this, and may be applied to various structures such as a watch type, a clip type, a glass type, or a folder type, a flip type, a slide type, a swing type, a swivel type to which two or more bodies are movably coupled. It will be related to a specific type of mobile terminal, but the description of a specific type of mobile terminal can be generally applied to other types of mobile terminals.

Here, the terminal body may be understood as a concept of referring to the mobile terminal 100 as at least one aggregate.

The mobile terminal 100 includes a case (for example, a frame, a housing, a cover, and the like) forming the appearance of the mobile terminal. As illustrated, the mobile terminal 100 may include a front case 101 and a rear case 102. Various electronic components are arranged in an inner space formed by coupling of the front case 101 and the rear case 102. At least one middle case may be additionally arranged between the front case 101 and the rear case 102.

The display 151 may be located on the front side of the mobile terminal body to output information. As illustrated, a window 151a of the display 151 may be mounted to the front case 101 to form the front surface of the mobile terminal body together with the front case 101.

In some embodiments, electronic components may also be mounted to the rear case 102. Examples of such electronic components include a detachable battery, an identification module, a memory card, and the like. In this case, a rear cover 102 may be detachably coupled to the rear case 102 to cover the electronic components mounted to the rear case. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. Meanwhile, the rear cover 103 may include an opening for externally exposing a rear camera part 121b, an optical output part 154, a flash 124, a rear input part 123a, and the like.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating various electronic components, the mobile terminal 100 may be configured such that one case forms the inner space. In this example, a mobile terminal 100 having a uni-body is formed in such a manner that synthetic resin or metal extends from a side surface to a rear surface.

Meanwhile, the mobile terminal 100 may include a waterproofing part (not shown) for preventing introduction of water into the mobile terminal body. For example, the waterproofing part may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display 151, the first audio output part 152a, the second audio output part 152b, the proximity sensor 141, the illumination sensor 142, the optical output part 154, a front camera part 121a, a rear camera part 121b, the first manipulating part 123a, the second manipulating part 123b, the microphone 122, the interface 160, and the like.

In the following, it is described by taking an example, as shown in FIGS. 2A and 2B, that the display 151, the first audio output part 152a, the proximity sensor 141, the illumination sensor 142, and the front camera part 121a are arranged at the front side of the mobile terminal body, that the manipulating part 123b, the second audio output part 152b, the microphone 122, and the interface 160 are arranged on a side surface of the mobile terminal body, and that the optical output part 154, the manipulating part 123a, the rear camera part 121b, and the flash 124 are arranged at a rear side of the mobile terminal body.

However, these components are not limited to the above-described arrangement. Such components may be excluded or replaced or arranged on a different surface, when necessary. For example, the manipulating part 123a may not be provided at the rear side of the mobile terminal body, and the second audio output part 152b may be provided not in the side surface of the mobile terminal body, but in the rear surface of the mobile terminal body.

The display 151 may display (output) information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, or an e-ink display.

The display 151 may be implemented using two display devices, according to an implementing form of the mobile terminal 100. In this case, a plurality of the displays may be arranged on one surface, either spaced apart from each other, or these devices may be integrated, or these devices may be arranged on different surfaces.

In order to receive a control command in a touching manner, the display 151 may include a touch sensor for sensing a touch input received at the display 151. When a touch is input to the display 151, the touch sensor may sense the touch and the controller 180 may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display (not shown) at a rear side of the window 151a, or a metal wire which is patterned directly on the rear surface of the window 151a. Alternatively, the touch sensor may be integrally formed with the display. For example, the touch sensor may be disposed on a substrate of the display or within the display.

As such, the display 151 may also form a touch screen together with the touch sensor. In this case, the touch screen may serve as the user input part 123 (see FIG. 1). In some cases, the touch screen may replace at least some of the functions of the first manipulating part 123a.

The first audio output part 152a may be implemented in the form of a receiver that delivers voice audio to a user's ear, and the second audio output part 152b may be implemented in the form of a loud speaker that outputs various alarm sounds or multimedia audio reproduction.

An aperture for releasing audio generated by the first audio output part 152a may be formed in the window 151a of the display 151. However, aspects of the present disclosure are not limited thereto, and audio may be released along an assembly gap between structural bodies (for example, a gap between the window 151a and the front case 101). In this case, a hole independently formed to output audio sounds may not be seen or may be hidden in terms of appearance, thereby further simplifying the appearance of the mobile terminal 100.

The optical output part 154 is configured to output light for indicating occurrence of an event. Examples of such events include a message reception, a call signal reception, a missed call, an alarm, a schedule notice, an email reception, information reception through an application, and the like. When a user has checked a generated event, the controller 180 can control the optical output part 154 to stop outputting light.

The front camera part 121a processes image frames such as still or moving images obtained by the image sensor in a capture mode or a video call mode. The processed image frames may be displayed on the display 151 and may be stored in the memory 170.

The first and second manipulating parts 123a and 123b are examples of the user input part 123 that is manipulated to receive a command for controlling operation of the mobile terminal 100. The first and second manipulating parts 123a and 123b may employ any tactile method that allows the user to perform manipulation such as touch, push, scroll, or the like. In addition, first and second manipulating parts 123a and 123b may employ any non-tactile method that allows the user to perform manipulation such as proximity touch, hovering, or the like.

The manipulating part 123a may be in the form of a mechanical key or a combination of a touch key and a mechanical key. In addition, the manipulating part 123a may be in the form layered with a finger scan sensor.

Input to be received by the first and second manipulating parts 123a and 123b may be set in various ways. For example, an input to a menu, a home key, cancellation, search, or the like may be input, and an input to control a volume level being output from the first or second audio output part 152a or 152b, to switch to a touch recognition mode of the display 151, or the like may be input.

As another example of the user input part 123, a rear input part (not shown) may be located at the rear side of the mobile terminal body. The rear input part is manipulated to receive an input for controlling operation of the mobile terminal 100. The input may be set in a variety of different ways. For example, the rear input part may receive an input for power on/off, start, end, scroll, control volume level being output from the first or second audio output part 152a or 152b, switch to a touch recognition mode of the display 151, and the like. The rear input part may be configured to allow a touch input, a push input, or combinations thereof.

The rear input part may be located to overlap the display 151 of the front side in a thickness direction of the mobile terminal body. As one example, the rear input part may be located on an upper end portion of the rear side of the mobile terminal body such that a user can easily manipulate it using a forefinger when the user grabs the mobile terminal body with one hand. However, aspects of the present disclosure are not limited thereto, and the position of the rear input part may change.

As such, when the rear input part is provided at the rear side of the mobile terminal body, a new type of user interface may be implemented using the rear input part. In addition, when the first manipulating part 123a is not located at the front side of the mobile terminal body since the aforementioned touch screen or the rear input part substitute for at least some functions of the first manipulating part 123a provided at the front side of the mobile terminal body, the display 151 may be in the form of a larger screen.

Meanwhile, the mobile terminal 100 may include a finger scan sensor for recognizing a user's fingerprint. The controller 180 may use fingerprint information sensed by the finger scan sensor as part of an authentication procedure. The finger scan sensor may be embedded in the display 151 in the user input part 123.

The microphone 122 is configured to receive a user's voice, other sound, and the like. The microphone 122 may be provided in plural to receive stereo sound.

The interface 160 serves as a path allowing the mobile terminal 100 to interface with an external device. For example, the interface 160 may include one or more of a connection mobile terminal for connecting to another device (for example, an earphone, an external speaker, or the like), a port for near field communication (for example, an Infrared Data Association (IrDA) port, a Bluetooth port, a wireless LAN port, and the like), or a power supply port for supplying power to the mobile terminal 100. The interface 160 may be implemented in the form of a socket for accommodating an external card, such as Subscriber Identification Module (SIM), User Identity Module (UIM), or a memory card for information storage.

The rear camera part 121b may be located at the rear side of the mobile terminal body. In this case, the rear camera part 121b may have an image capturing direction substantially opposite to that of the front camera part 121a.

The rear camera part 121b may include a plurality of camera.

The flash 124 may be located adjacent to the rear camera part 121b. When an image of a subject is captured with the rear camera part 121b, the flash 124 may illuminate the subject.

The second audio output part 152b may be additionally arranged in the mobile terminal body. The second audio output part 152b may implement stereophonic sound functions in conjunction with the first audio output part 152a, and may be also used for implementing a speaker phone mode for call communication.

At least one antenna for wireless communication may be located on the mobile terminal body. The antenna may be installed in the mobile terminal body or formed by the case. For example, an antenna which configures a part of the broadcast receiver 111 may be retractable into the mobile terminal body. Alternatively, an antenna may be in the form of a film attached to an inner surface of the rear cover 103 or in the form of a case including a conductive material.

A power supply 190 (see FIG. 1) for supplying power to the mobile terminal 100 may be provided at the mobile terminal body. The power supply 190 may include a battery 191 embedded in in the mobile terminal body or detachably coupled to an outside of the mobile terminal body.

The battery 191 may be configured to receive power via a power source cable connected to the interface 160. Also, the battery 191 may be configured to be recharged in a wireless manner using a wireless charger. Wireless charging may be implemented by magnetic induction (electromagnetic resonance).

Meanwhile, in the drawing, the rear cover 103 is coupled to the rear case 102 for shielding the battery 191, to prevent separation of the battery 191, and to protect the battery 191 from an external impact or from foreign material. When the battery 191 is detachable from the mobile terminal body, the rear case 103 may be detachably coupled to the rear case 102.

Figure 3:
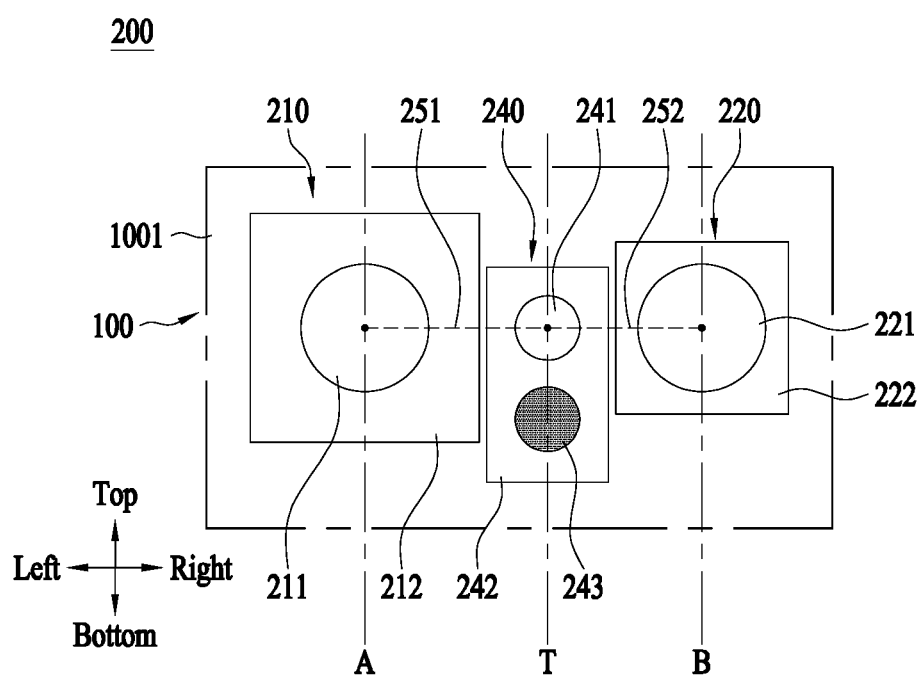
FIG. 3 is a conceptual view illustrating a camera part disposed at a rear surface of a body of a mobile terminal according to the present disclosure.

FIG. 3 is a conceptual view illustrating a camera part 200 disposed at a rear surface 1001 of a body of the mobile terminal 100 according to the present disclosure.

Hereinafter, the camera part 200 may refer to a set including a plurality of cameras disposed adjacent to each other. The camera part 200 may be, for example, the rear camera part described above. Thus, the following description will be based on an example in which the camera part 200 is disposed at the rear surface of the body of the mobile terminal 100. This is because, generally, more space for the plurality of cameras may be provided on the rear surface of the body of the mobile terminal 100 and mounting the high-functional camera part 200 including the plurality of cameras on the rear surface may be more advantageous in terms of usability. However, technical characteristics of the present disclosure are not limited thereto. The camera part 200 may also be disposed at a front surface of the mobile terminal 100 as well as the rear surface. In addition, the camera part 200 may be disposed at a side surface of the mobile terminal 100. As such, an area in which the camera part 200 is mounted is not limited by a shape of the body.

In a definition related to a direction, when the camera part 200 is disposed at the rear surface, a lens part corresponding to an entrance surface of the camera part 200 is disposed toward outside and thus, a front surface of the camera part 200 may be a rear surface based on the mobile terminal 100.

Also, the below-described camera part 200 may refer to a set of three of four cameras. For example, one of the three or four cameras may be a time-of-flight (ToF) camera and remaining cameras may be red-green-blue (RGB) cameras. As would be apparent to one skilled in the art, the ToF camera may be replaced with a shape camera that acquires a three-dimensional (3D) image of an object in different ways, such as, a structured light (SL) camera. Also, the RGB camera may be replaced with a camera that acquires a two-dimensional (2D) image of an object in different ways, such as an infrared camera or a thermal imaging camera.

The ToF camera may calculate a value of a distance from an object based on a time for which light emitted from a lens part is reflected and returns from the object. A distance value for each point of the object may be represented as depth data. Based on the depth data, a shape image such as a depth image may be acquired.

Each of the cameras may include a lens part for refracting and receiving the light reflected at the object and a sensor (e.g., an image sensor for the RGB camera and an infrared (IR) sensor for the ToF camera) for imaging the received light.

Also, each of the cameras may include a holder to physically mount components such as the lens part and the sensor thereon. Specifically, the holder may expose an entrance surface to outside such that the lens part receives light at the front surface. The holder may serve as a fastening device on the mobile terminal 100. The holder may be provided in a rectangular parallelepiped shape and fixedly inserted into a camera bracket of the mobile terminal 100. More specifically, a transverse section of the RGB camera may be a square. The holder may have the rectangular parallelepiped shape or a regular hexahedron shape.

A light source of the RGB camera may be external light. In contrast, a ToF camera 240 may emit light having a separate wavelength (e.g., infrared wavelength) so that a lens part (hereinafter, referred to as "the ToF lens part 241") receives the light. The ToF camera 240 may include a light emitting part 243 separately to emit the light. The light emitting part 243 may be, for example, a vertical cavity surface emitting laser (VCSEL).

An RGB image acquired by the RGB camera and a shape image may be synthesized to be used. In this case, the synthesized image acquired by the RGB camera and the ToF camera may have a portion in which the RGB image does not match depth data due to a disparity, which is referred to as "occlusion." The occlusion may correspond to one of errors occurring due to a disparity of a plurality of cameras.

To minimize an occurrence of occlusion, a distance between cameras used for acquiring a synthesized image may be minimized. However, in general, it has been common to place cameras without considering the occurrence of the occlusion.

Hereinafter, an arrangement of the RGB camera and the ToF camera 240 for minimizing the occurrence of the occlusion will be described.

Referring to FIG. 3, the camera part 200 includes a first RGB camera 210, a second RGB camera 220, and the ToF camera 240. A shape image acquired by the ToF camera 240 may be synthesized with a first RGB image acquired by the first RGB camera 210 or a second RGB image acquired by the second RGB camera 220 to be used.

To minimize an occurrence of occlusion, the ToF camera 240 may be disposed between the first RGB camera 210 and the second RGB camera 220. In a case in which a ToF camera is located between RGB cameras, it is possible to prevent a distance from one RGB camera to the ToF camera from being increased by the other RGB camera, thereby minimizing the occurrence of the occlusion.

Here, a meaning of "between" may be defined based on a positional relationship between parallel lines, each passing a center of a lens of each camera. In the example of FIG. 3, a line T passing a center of a ToF receiver 241 may be located between a line A passing a center of a first lens part 211 and a line B passing a center of a second lens part 221.

If viewed from each holder, a ToF holder 242 of the ToF camera 240 may be disposed between a first holder 212 of the first RGB camera 210 and a second holder 222 of the second RGB camera 220. Specifically, edges of both sides of the ToF holder 242 may respectively face one edge of the first holder 212 and one edge of the second holder 222. Here, a meaning of "facing" may indicate that edges of two holders facing each other are positioned to be adjacent in parallel and may not necessarily physically contact each other.

The first holder 212, the second holder 222, and the ToF holder 242 are named for ease of explanation, and characteristics thereof are for easily mounting and fixing lens parts of cameras and related components. The holders may have similar characteristics.

Desirably, the first RGB camera 210, the second RGB camera 220, and the ToF camera 240 may be disposed on one straight line. In this case, the first RGB camera 210, the ToF camera 240, and the second RGB camera 220 may be arranged sequentially in a horizontal direction without deviating with respect to a vertical direction. This is to prevent distances between the cameras from being increased due to a vertical component.

More specifically, a center of the first lens part 211 of the first RGB camera 210, a center of the second lens part 221 of the second RGB camera 220, and a center of the ToF lens part 241 of the ToF camera 240 may be on one straight line. Because an occurrence of occlusion is substantially determined based on a distance between lens parts of cameras, the distance needs to be minimized to minimize the occurrence of occlusion.

A distance from the center of the first lens part 211 of the first RGB camera 210 to the center of the ToF lens part 241 may be referred to as a first base line 251. A distance from the center of the second lens part 221 of the second RGB camera 220 to the center of the ToF lens part 241 may be referred to as a second base line 252. A distance from a center of a third lens part 231 of the third RGB camera 230 to the center of the ToF lens part 241 may be referred to as a third base line 253. When the center of the first lens part 211 of the first RGB camera 210, the center of the second lens part 221 of the second RGB camera 220, and the center of the ToF lens part 241 of the ToF camera 240 are on one straight line, lengths of the first base line 251 and the second base line 252 may be minimized.

When the light emitting part 243 and the ToF lens part 241 are disposed on the ToF holder 242, an arrangement direction of the light emitting part 243 and the ToF lens part 241 may be vertical to an arrangement direction of the above-described cameras (in the present example, the horizontal direction). This may prevent the distances between the ToF lens part 241 and the first and second lens parts 211 and 221 of the first and second RGB cameras from being increased due to the light emitting part 243 not affecting the occlusion.

Although FIG. 3 illustrates the first RGB camera 210, the ToF camera 240, and the second RGB camera 220 are arranged in a left-to-right direction based on the rear surface of the mobile terminal 100 as an example, the order of arrangement may be reversed by 180-degree rotation. In some cases, as would be apparent to one skilled in the art, the first RGB camera 210, the ToF camera 240, and the second RGB camera 220 may also be arranged in a top-to-bottom direction by 90-degree clockwise rotation or counterclockwise rotation. The same applies to embodiments described below.

Figure 4:
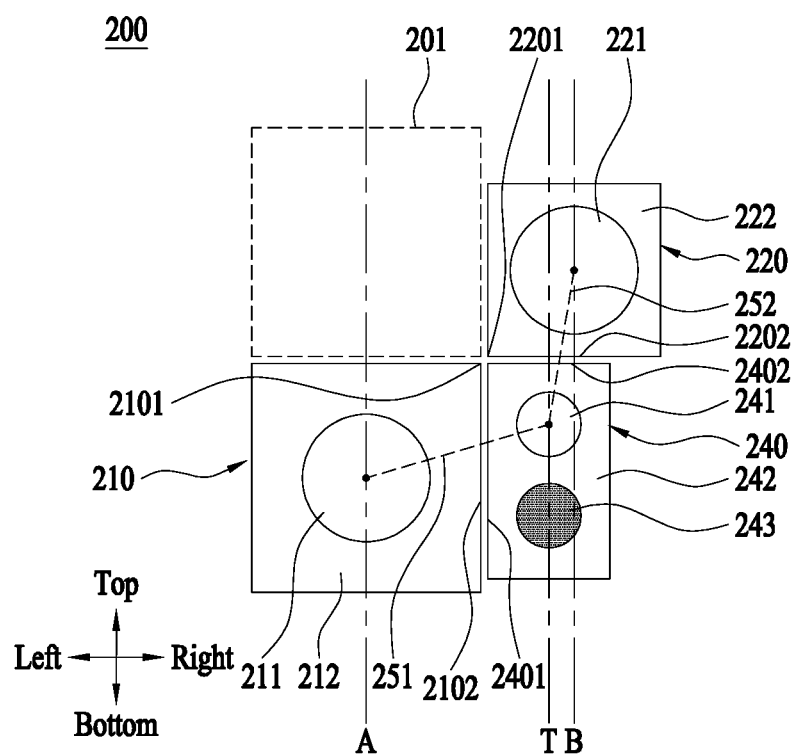
FIG. 4 illustrates an example of arranging a red-green-blue (RGB) camera and a time-of-flight (ToF) camera according to the present disclosure.

FIG. 4 illustrates an example of arranging the first RGB camera 210, the second RGB camera 220, and the ToF camera 240 according to the present disclosure.

Since an outer perimeter of the camera part 200 may affect an arrangement of another component, for example, a component 272 to be mounted on the mobile terminal 100, the camera part 200 may be arranged in various ways or in a way suitable for each situation. Hereinafter, a type of arrangement different from that of FIG. 3 will be described.

A first direction in which the first RGB camera 210 and the ToF camera 240 are arranged may be substantially vertical to a second direction in which the second RGB camera 220 and the ToF camera 240 are arranged.

For example, the first holder 212 and the ToF holder 242 may be arranged in a horizontal direction, and the second holder 222 and the ToF holder 242 may be arranged in a vertical direction.

However, due to interferences of the first holder 212 and the second holder 222, the first base line 251 may not be exactly vertical to the second base line 252.

In view of this, possible arrangements are as follows. The first holder 212 and the second holder 222 may be disposed on a diagonal line such that a corner 2101 of the first holder 212 and a corner 2201 of the second holder 222 face each other. Also, two neighboring edges 2401, 2402 on a side on which the ToF lens part 241 is provided in the ToF holder 242 may respectively face one edge 2102 of the first holder 212 and one edge 2202 of the second holder 222. For example, in addition to the first holder 212 to the ToF holder 242, when a virtual holder 201 having a virtual rectangular front surface is assumed, corners of the four holders 201, 211, 221, and 241 may meet at one point.

The aforementioned arrangement may reduce the lengths of the first base line 251 and the second base line 252 and also reduce a space occupied by the camera part 200.

Referring to FIG. 4, similar to the example of FIG. 3, the line T is located between the line A and the line B. Also, based on base lines, it can be seen that an angle formed by each of the base lines is an obtuse angle of 90 degrees)(° or more.

Likewise, the ToF holder 242 having a long edge 2401 and a short edge 2402 may be positioned such that the long edge 2401 faces one of the first holder 212 and the second holder 222, the one having a longer edge (in the example of FIG. 4, the first holder).

Figure 5:
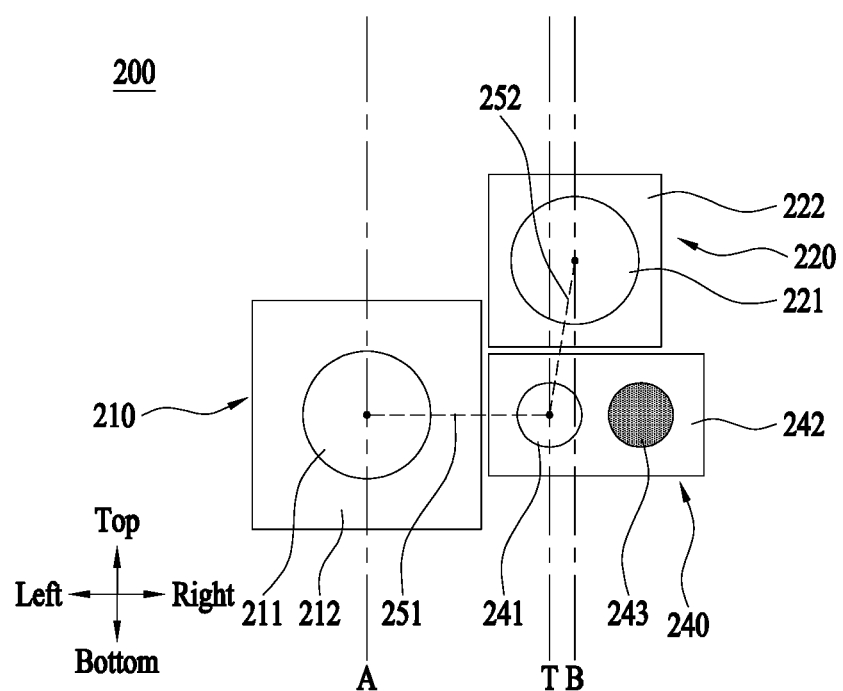
FIG. 5 illustrates another example of arranging an RGB camera and a ToF camera according to the present disclosure.

FIG. 5 illustrates another example of arranging the first RGB camera 210, the second RGB camera 220, and the ToF camera 240 according to the present disclosure.

As another example of implementing the camera part 200 in a short base line and a small area, the arrangement of the camera part 200 of FIG. 4 may be modified as follows.

Referring to FIG. 5, holders may be arranged such that corners of two of the holders are located adjacent to a center portion of one edge of a remaining holder. In this case, the arrangement of the holders may form a triangular shape. For example, one edge of the second holder 222 and one edge of the ToF holder 242 may be positioned to simultaneously face one edge of the first holder 212. Also, another edge of the second holder 222 adjoining with the one edge of the second holder 222 and another edge of the ToF holder 242 adjoining with the one edge of the ToF holder 242 may face each other.

As a result, in the present example, the line T may also be located between the line A and the line B.

Desirably, at least one of the first base line 251 and the second base line 252 may be vertical or horizontal. However, since a holder of the RGB camera may be generally greater in size than a holder of the ToF camera, it is impossible to arrange both base lines 251 and 252 to be vertical or horizontal and thus, only one of the base lines may be vertically or horizontally arranged. In this case, it is desirable to provide the holder having the edge adjacent to the two corners of the two holders (in the example of FIG. 5, the first holder 212) in a relatively large size. This is because when a base line corresponding to a small holder is first placed vertically or horizontally, the corresponding base line may be shortened but a degree to which a large holder is dislocated from an ideal base line may increase.

Figure 6:
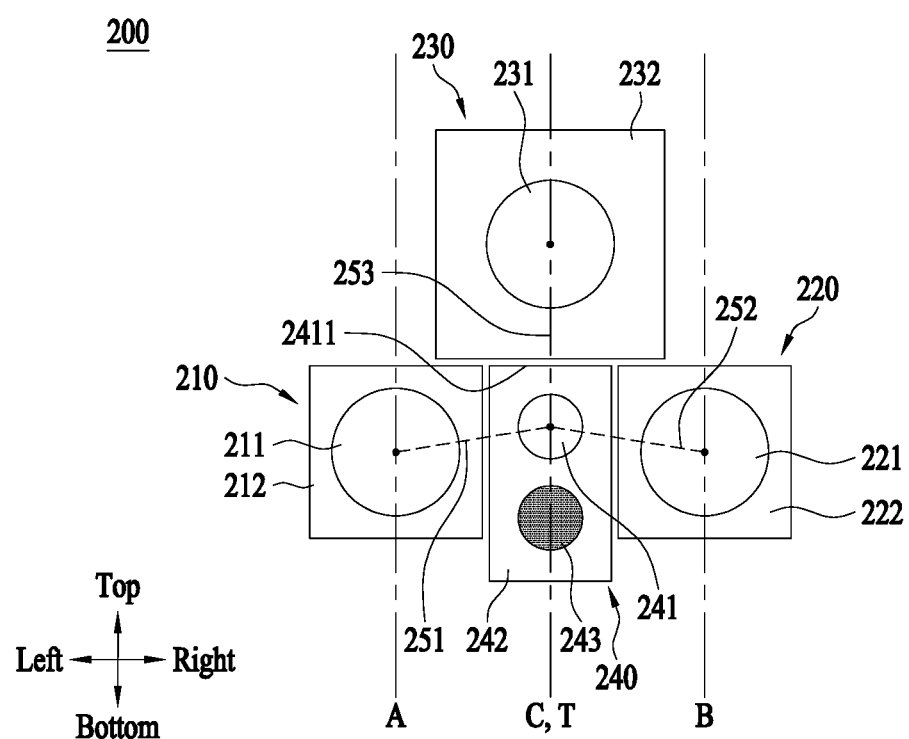
FIG. 6 illustrates another example of arranging an RGB camera and a ToF camera according to the present disclosure.

FIG. 6 illustrates an example of arranging the first RGB camera 210, the second RGB camera 220, a third RGB camera 230, and the ToF camera 240 according to the present disclosure.

The foregoing examples relate to arranging the first RGB camera 210, the second RGB camera 220, and the ToF camera 240 in a case in which the camera part 200 includes the two RGB cameras 210 and 220, and the single ToF camera 240. In the following examples, a description is given of arranging the first RGB camera 210, the second RGB camera 220, a third RGB camera 230, and the ToF camera 240 in a case in which the camera part 200 includes three RGB cameras (e.g., the first RGB camera 210, the second RGB camera 220, and the third RGB camera 230) and the single ToF camera 240.

To minimize the first, second, and third base lines 251, 252, and 253, the center of the first lens part 211, the center of the second lens part 221, and the center of the third lens part 231 may be arranged to form a triangle and the center of the ToF lens part 241 may be positioned inside the triangle. Through this, it is possible to prevent one of the base lines from excessively increasing as compared to other base lines, thereby preventing an excessive increase of an occlusion.

Ideally, the center of the first lens part 211, the center of the second lens part 221, and the center of the third lens part 231 may form a regular triangle and so that the center of the ToF lens part 241 is positioned on a centroid of the triangle.

However, in consideration of a holder, such arrangement may be hardly implementable in practice. Thus, considering the holder as well, the first holder 212, the second holder 222, and a third holder 232 may be arranged such that edges of the holders respectively face three edges close to the ToF lens part 241 on the ToF holder 242.

Under this premise, it is ideal to arrange the cameras such that the base lines are vertical or horizontal. In this case, the base lines may be minimized, which may minimize an occurrence of occlusion.

However, such an ideal arrangement may be hardly implementable due to interferences of the first holder 212, the second holder 222, and the third holder 232. Thus, a base line (in the example of FIG. 6, the third base line 253) corresponding to a largest holder (in the example of FIG. 6, the third holder 232) may be provided vertically or horizontally, and then other holders may be arranged. As explained with reference to FIG. 5, this is because when a base line corresponding to a small holder is first placed vertically or horizontally, a degree to which a large holder is dislocated from an ideal base line may increase.

Also, similar to the example of FIG. 3, when the ToF lens part 241 and the light emitting part 243 are mounted on the ToF holder 242, an edge of a portion in which the light emitting part 243 is mounted on the ToF holder 242 may not face another RGB holder.

As described above, the ToF holder 242 may be arranged such that three edges close to the ToF lens part 241 face edges of the corresponding holders, respectively. In this case, it is desirable to arrange a base line (in the example of FIG. 6, the third base line 253) of a largest holder (in the example of FIG. 6, the third holder 232) to be vertical or horizontal to an edge 2411 on a side opposite to the light emitting part 243, and then arrange two remaining holders (in the example of FIG. 6, the first holder 212 and the second holder 222).

As the foregoing examples, it can be known from the present example that the line T is between the line A and the line B, between the line A and the line C (including a case of being on the same line), and between the line B and the line C (including a case of being on the same line).

Figure 7A:
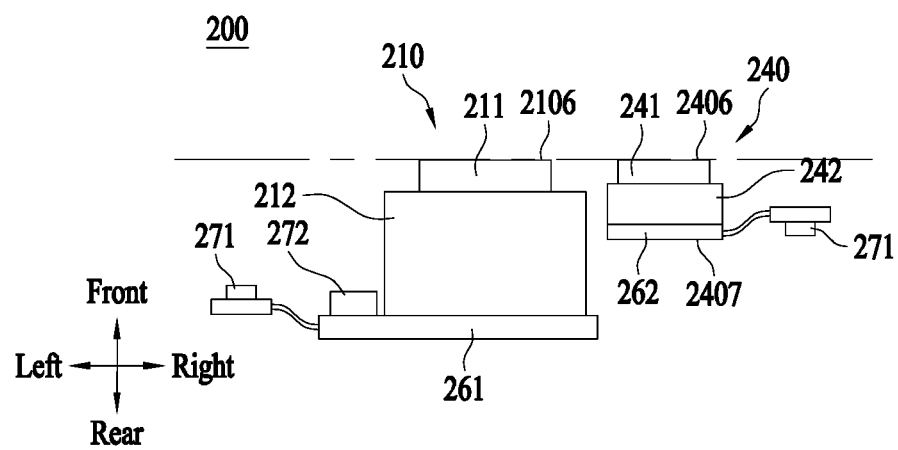
FIGS. 7A and 7B are a side conceptual view and a front conceptual view illustrating a camera part according to the present disclosure.
Figure 7B:
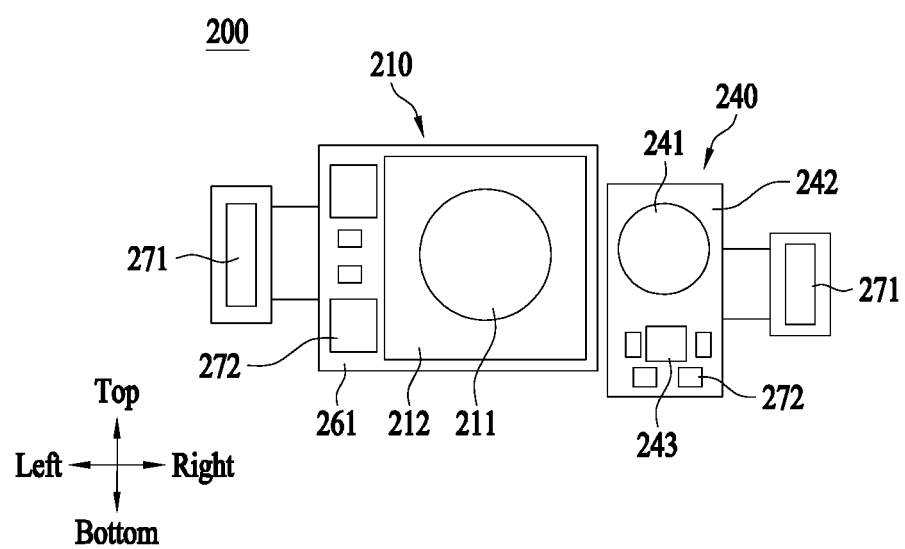

FIGS. 7A and 7B are a side conceptual view and a front conceptual view illustrating the camera part 200 according to the present disclosure.

An RGB camera may further include a structure for placement of an optical image stabilizer (OIS), an auto focus (AF), and the like and thus, may be greater than in size than the ToF camera 240 in general. This may also apply to an optical axis direction, that is, a height direction of a camera.

In view of such characteristics, the ToF camera 240 may be disposed to be spaced apart from a bottom surface. In this case, a free space may be formed on the rear surface of the ToF camera 240.

In the free space of the rear surface, a driver integrated circuit (IC), for example, the component 272 for driving each camera, a motion sensor (e.g., an accelerometer or a gyro sensor), and passive elements (e.g., a cap, a resistor, an inductor, etc.) may be provided. Also, a connector 271 may be disposed in the free space to reduce a horizontal space required for the camera part 200.

Most desirably, a front surface 2106 of the first RGB camera 210 and a front surface of the ToF camera 240 may be arranged to be on the same line. When the front surface 2106 and the front surface 2406 are arranged on the same line, a free space on a rear surface may be maximally utilized while preventing an increase of an area protruding from the mobile terminal 100 due to the ToF camera 240 being spaced apart from the bottom surface. In addition, an ease of designing a camera cover may be achieved. Also, by eliminating a height difference between the first lens part 211 and the ToF lens part 241 with respect to a vertical direction, a degree of occlusion may be reduced.

For separation of the ToF camera 240, separated printed circuit boards (PCB) may be provided. For example, a PCB on which electronic components (e.g., the component 272) of the camera part 200 may include a first PCB 261 and a second PCB 262 separated from each other. In this example, the first RGB camera 210 may be mounted on the first PCB 261 and the ToF camera 240 may be mounted on the second PCB 262. The second PCB 262 may be disposed to be higher than the first PCB 261.

A component for driving the first RGB camera 210 may be mounted on the first PCB 261 and a component for driving the ToF camera 240 may be mounted on the second PCB 262. In some cases, the component 272 may be disposed without such separation. The PCB may be connected to a main PCB of the mobile terminal 100 through the connector 271.

Figure 8A:
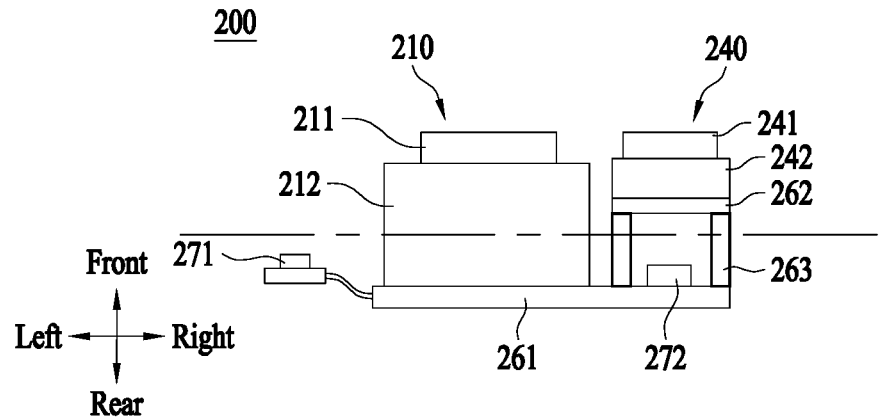
FIGS. 8A through 8C are a side conceptual view, a front conceptual view, and a transverse-section conceptual view illustrating a camera part according to the present disclosure.
Figure 8B:
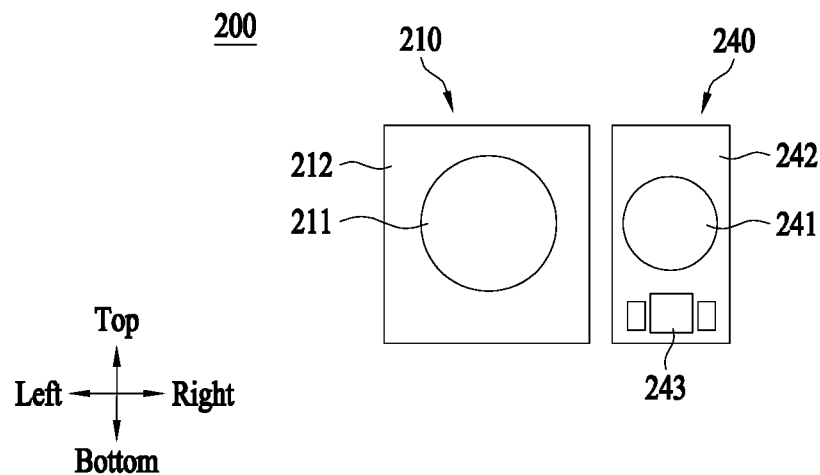
Figure 8C:
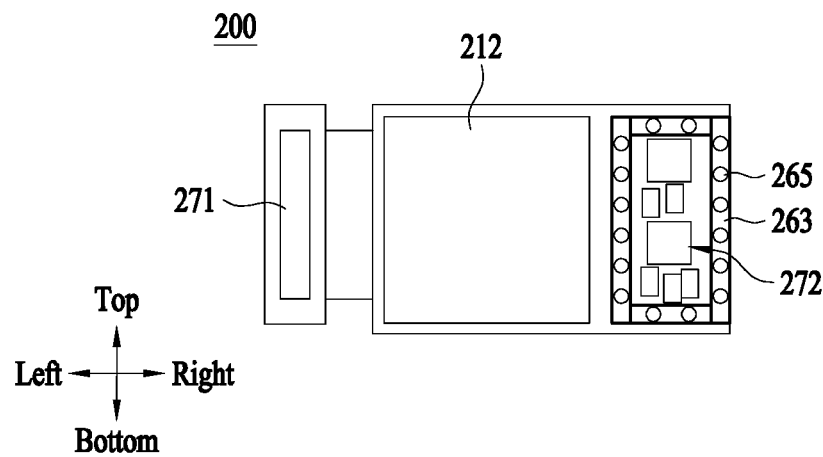

FIGS. 8A through 8C are a side conceptual view, a front conceptual view, and a transverse-section conceptual view illustrating the camera part 200 according to the present disclosure.

To arrange the ToF camera 240 to be spaced apart from the bottom surface, the first PCB 261 and the second PCB 262 may be connected through a vertical partition 263.

Specifically, based on a horizontal plane, the second PCB 262 may form an overlapping area in which at least one area of the second PCB 262 is included in the first PCB 261. The component 272 for driving a camera may be mounted on a portion of the overlapping area. In another portion of the overlapping area, the vertical partition 263 may be disposed to vertically connect the first PCB 261 and the second PCB 262. The vertical partition 263 may not only physically support the second PCB 262 to maintain a height but also form a path for electrically connecting the first PCB 261 and the second PCB 262.

A via 265 may be provided in a via-hole or a through-hole formed in the vertical partition 263 to electrically connect the first PCB 261 and the second PCB 262.

The light emitting part 243 may be disposed on the second PCB 262. The aforementioned driver IC, motion sensor, passive elements, and the like may be provided in one area of the first PCB 261. The components 272 may be mounted irrespective of whether the components 272 belong to the first RGB camera 210 or the ToF camera 240. Furthermore, if the second RGB camera 220 is provided, the component 272 thereof may also be included.

FIGS. 9A through 10C are side conceptual views, front conceptual views, and transverse-section conceptual views illustrating the camera part 200 according to the present disclosure.

To arrange the ToF camera 240 to be spaced apart from the bottom surface, a holder of an RGB camera may be used for positioning the ToF holder 242.

For example, at least one area of the ToF holder 242 may overlap the first holder 212 or the second holder 222 so that the ToF holder 242 is spaced apart from the bottom surface. Such an overlapping structure may lead to a synergistic effect of reducing a width of the camera part 200 with respect to the horizontal direction.

At least one area of each of the ToF holder 242 and the second PCB 262 may overlap one of the first holder 212 or the second holder 222. Such arrangement may be suitable for a case in which one of the first holder 212 and the second holder 222 is greater in height so that a height difference occurs therebetween. In this case, a portion of the ToF holder 242 may be placed on an RGB camera holder having a less height, thereby increasing a spatial efficiency in a vertical or horizontal direction. In this disclosure, it is assumed that the height of the second holder 222 is less than the height of the first holder 212. However, this is not limitative and vice versa. An RGB camera corresponding to a holder having a greater height may be, for example, a general angle-of-view camera equipped with the component 272 for driving an AF or an OIS. An RGB camera corresponding to a holder having a less height may be, for example, a fixed-focus type camera such as a wide-angle or ultra-wide-angle camera, in general.

Figure 9A:
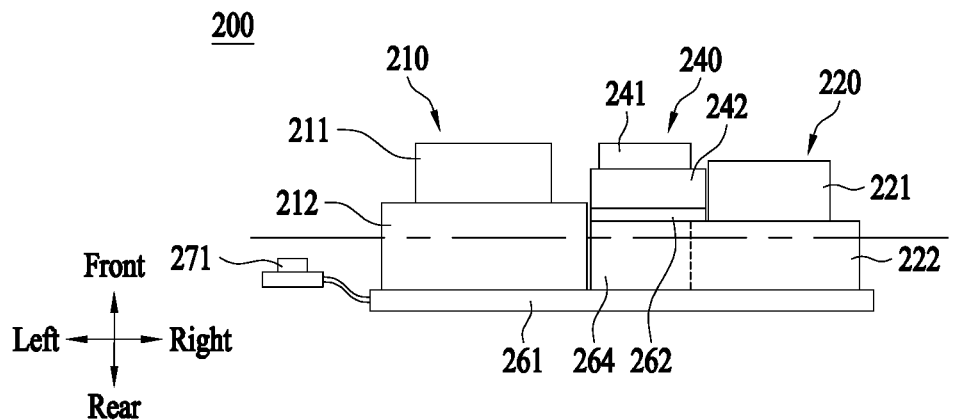
FIGS. 9A through 9C are a side conceptual view, a front conceptual view, and a transverse-section conceptual view illustrating a camera part according to the present disclosure.
Figure 9B:
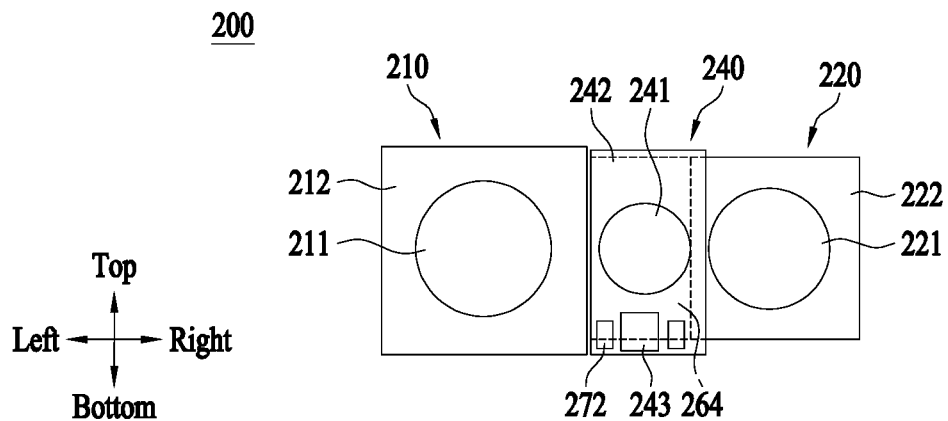
Figure 9C:
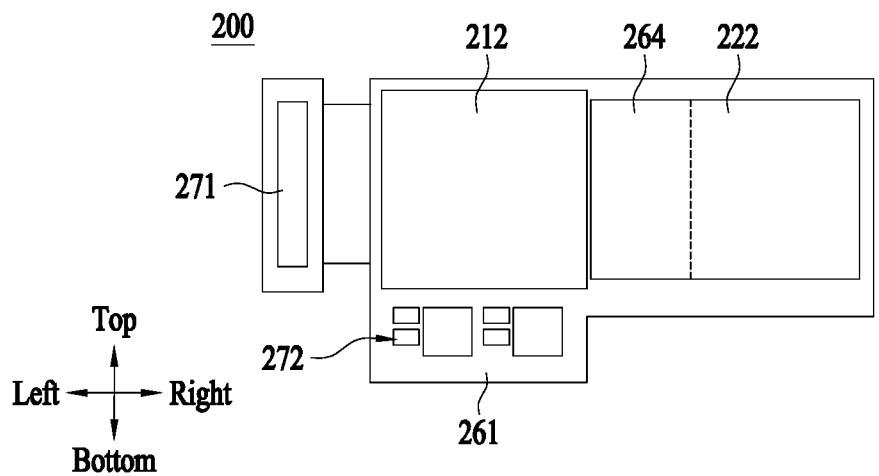

Referring to FIG. 9, to support the ToF holder 242, the second holder 222 may form an extended portion 264 that is horizontally extended farther than a required width. The extended portion 264 may support at least a half of an area of the ToF holder 242 so that the ToF holder 242 is sufficiently supported.

When a holder of the extended portion 264 is provided, the connector 271 and the components 272 for driving each camera may be located in one area of the first PCB 261. In this case, a connector for electrically connecting the first PCB 261 and the second PCB 262 may be mounted on the extended portion 264.

Figure 10A:
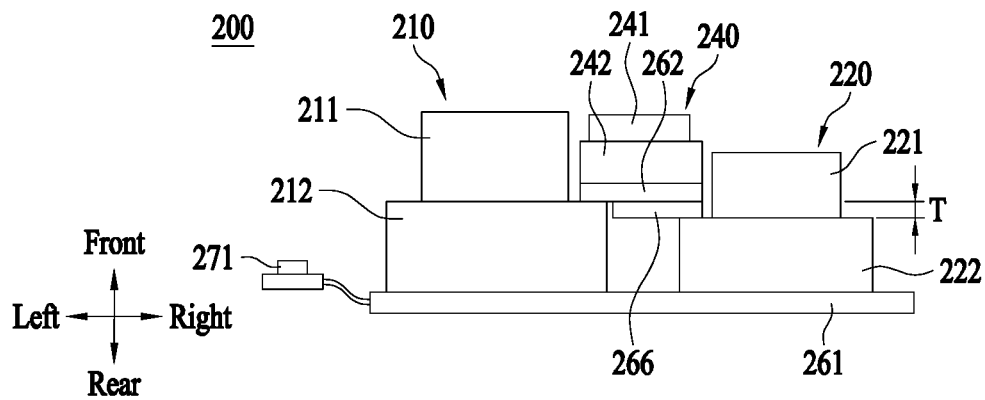
FIGS. 10A through 10C are a side conceptual view, a front conceptual view, and a transverse-section conceptual view illustrating a camera part according to the present disclosure.
Figure 10B:
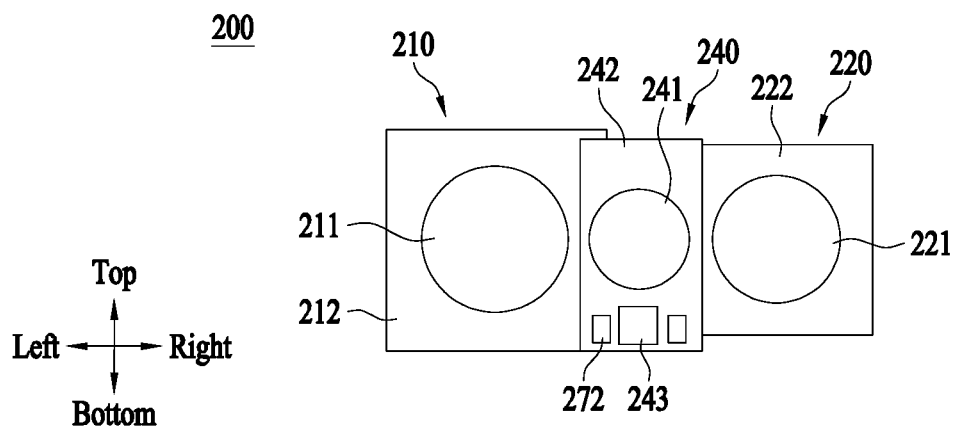
Figure 10C:
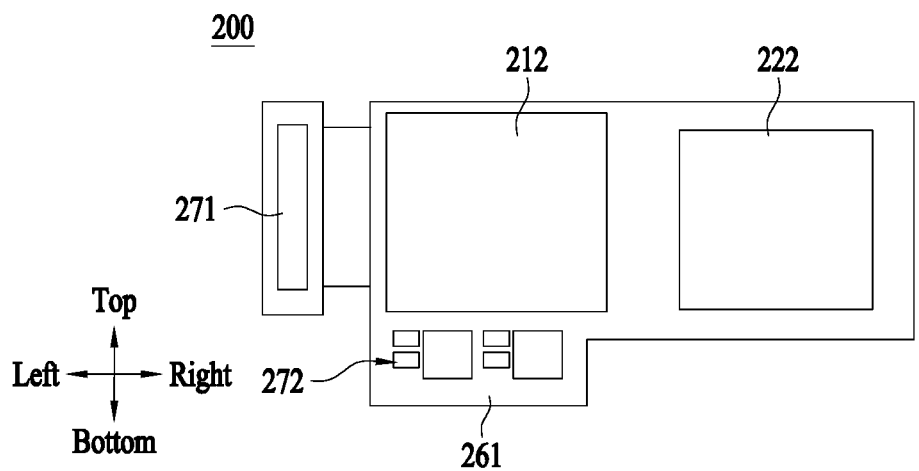

Referring to FIG. 10, the ToF holder 242 may be disposed to simultaneously support the front surfaces of the first holder 212 and the second holder 222. When the ToF holder 242 simultaneously supports the front surfaces of the first holder 212 and the second holder 222, an overlapping area between the ToF holder 242 and a holder of an RGB camera may be maximized so that a space for the camera part 200 is minimized with respect to the horizontal direction.

When the ToF holder 242 is disposed to simultaneously support the front surfaces of the first holder 212 and the second holder 222, it may be difficult for the ToF holder 242 to simultaneously support the first holder 212 and the second holder 222 due to a difference in height between the first holder 212 and the second holder 222. To solve this, a reinforcement plate 266 may be provided on the rear surface of the ToF holder 242, specifically, the rear surface of the second PCB 262. The reinforcement plate 266 may compensate for a height difference T between the first holder 212 and the second holder 222 to secure a structural stability of the camera part 200. For example, at least a portion of a rear surface of the reinforcement plate 266 may support the front surface of the second holder 222. Also, when at least a portion of a side surface of the reinforcement plate 266 supports a side surface of the first holder 212, a fixing force to the side may be secured, which may increase the structural stability.

In this case, the connector 271 and the component 272 for driving the camera may be located in one area of the first PCB 261 as described with reference to FIG. 9.

Figure 11A:
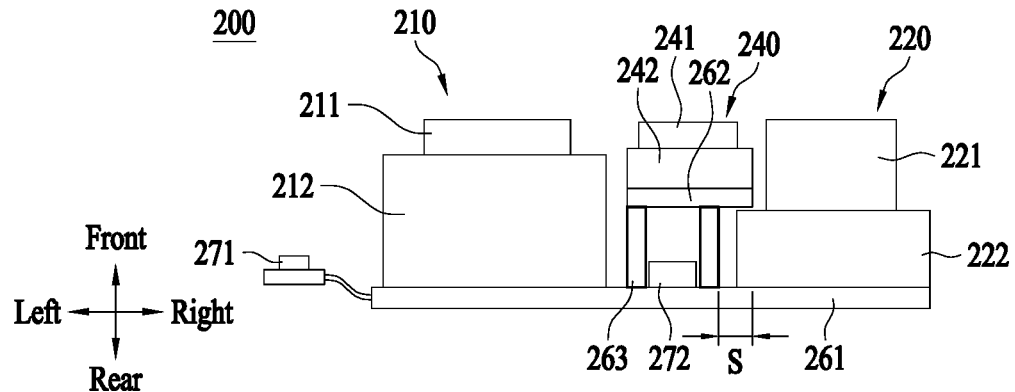
FIGS. 11A through 11C are a side conceptual view, a front conceptual view, and a transverse-section conceptual view illustrating a camera part according to the present disclosure.
Figure 11B:
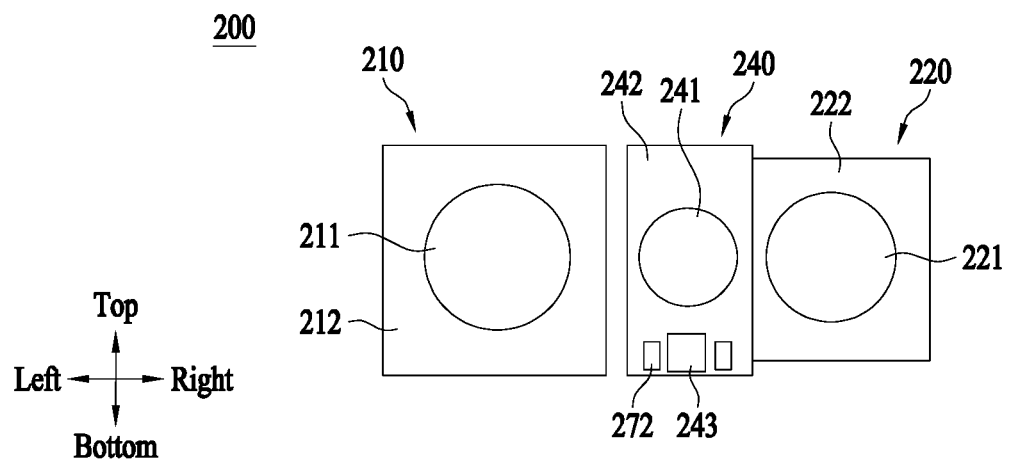
Figure 11C:
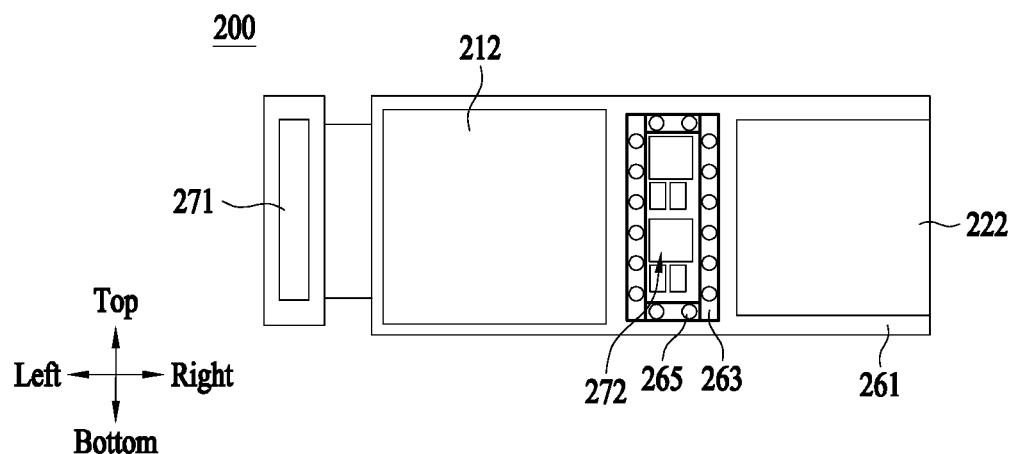

FIGS. 11A through 11C are a side conceptual view, a front conceptual view, and a transverse-section conceptual view illustrating the camera part 200 according to the present disclosure.

A structure in which the ToF holder 242 overlaps another holder may be implemented by using the features of the vertical partition 263 of FIG. 8. For example, the ToF holder 242 may be disposed to partially overlap a front surface of the second holder 222. Also, the vertical partition 263 may be disposed to support the ToF holder 242, for example, the rear surface of the second PCB 262 located on the rear surface of the ToF holder 242. A difference from the example of FIG. 8 is that, instead of all of the vertical partitions 263 supporting the outer perimeter of the second PCB 262, at least one of the vertical partitions 263 is inwardly shifted by S to secure a space for the second holder 222.

A mobile terminal of the present disclosure is described as follows.

According to at least one example embodiment of the present disclosure, it is possible to minimize a space occupied by a camera in a mobile terminal.

Further, according to at least one example embodiment of the present disclosure, it is possible to minimize an occurrence of occlusion.

Additional ranges of possibilities will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

It is apparent to those skilled in the art that the present disclosure may be materialized in other specific forms without departing from the essential characteristics of the present disclosure.

The detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A mobile terminal comprising:
a body;
a first red-green-blue (RGB) camera;
a second RGB camera; and
a time-of-flight (ToF) camera,
wherein the first RGB camera, the second RGB camera, and the ToF camera are coupled to the body,
wherein the first RGB camera comprises:
a first lens part configured to receive light; and
a first holder configured to mount the first lens part,
wherein the second RGB camera comprises:
a second lens part configured to receive light; and
a second holder configured to mount the second lens part,
wherein the ToF camera comprises:
a light emitting part;
a ToF lens part configured to receive light emitted from the light emitting part and reflected from an object; and
a ToF holder configured to mount the light emitting part and the ToF lens part,
wherein the first lens part, the second lens part, and the ToF lens part are located at one side of the body to be exposed outside,
wherein the first holder, the second holder, and the ToF holder each have a rectangular transverse-section, and
wherein the first holder, the second holder, and the ToF holder are arranged such that the ToF lens part is located between the first lens part and the second lens part, and the light emitting part is positioned at a location that does not affect a distance between the ToF lens part and the first lens part and does not affect a distance between the ToF lens part and the second lens part.

2. The mobile terminal of claim 1, wherein a center of the first lens part, a center of the ToF lens part, and a center of the second lens part are on one straight line.

3. The mobile terminal of claim 1, wherein an arrangement direction of the first holder, the ToF holder, and the second holder is vertical to an arrangement direction of the light emitting part and the ToF lens part.

4. The mobile terminal of claim 1, wherein the first holder and the second holder are arranged on a diagonal line such that one corner of the first holder and one corner of the second holder face each other, and two neighboring edges of the ToF holder are positioned to respectively face one edge of the first holder and one edge of the second holder.

5. The mobile terminal of claim 1, wherein one edge of the second holder and one edge of the ToF holder are positioned to simultaneously face one edge of the first holder, and another edge of the second holder adjoining with the one edge of the second holder and another edge of the ToF holder adjoining with the one edge of the ToF holder are positioned to face each other.

6. The mobile terminal of claim 5, wherein at least one of a first base line connecting a center of the first lens part and a center of the ToF lens part and a second base line connecting a center of the second lens part and the center of the ToF lens part intersects vertically with one edge of the ToF holder.

7. The mobile terminal of claim 6, wherein the first holder is greater in size than the second holder, and the first base line intersects vertically with one edge of the ToF holder.

8. The mobile terminal of claim 1, further comprising:
a third RGB camera coupled to the body;
a third lens part included in the third RGB camera to receive light; and
a third holder configured to mount the third lens part included in the third RGB camera,
wherein three edges of the ToF holder are positioned to respectively face edges of the first holder, the second holder, and the third holder.

9. The mobile terminal of claim 8, wherein at least one of a first base line connecting a center of the first lens part and a center of the ToF lens part, a second base line connecting a center of the second lens part and the center of the ToF lens part, or a third base line connecting a center of the third lens part and the center of the ToF lens part, intersect vertically with one edge of the ToF holder.

10. The mobile terminal of claim 9, wherein the third holder is greater in size than the first holder and the second holder,
one edge of the first holder and one edge of the second holder are positioned to respectively face edges of both sides of the ToF holder, and
the third base line intersects vertically with one edge of the ToF holder.

11. The mobile terminal of claim 1, further comprising:
a first printed circuit board (PCB) on which the first RGB camera is mounted; and
a second PCB on which the ToF camera is mounted,
wherein the second PCB is disposed above the first PCB based on a thickness direction of the body.

12. The mobile terminal of claim 11, wherein a front surface of the first lens part, or a front surface of the second lens part, and a front surface of the ToF lens part are on a same plane.

13. The mobile terminal of claim 11, wherein the second PCB forms an overlapping area in which at least one area of the second PCB is included in the first PCB, and the mobile terminal further comprises:
a vertical partition configured to vertically connect the first PCB and the second PCB in the overlapping area; and
a via formed in the vertical partition to electrically connect the first PCB and the second PCB.

14. The mobile terminal of claim 11, wherein at least one area of the ToF holder overlaps at least one of the first holder or the second holder.

15. The mobile terminal of claim 14, wherein a height of a front surface of the second holder is less than a height of a front surface of the first holder based on a thickness direction of the body, and
    at least one area of a rear surface of the second PCB supports the front surface of the second holder.

16. The mobile terminal of claim 15, wherein the second holder comprises an extended portion that extends in a horizontal direction to support the rear surface of the ToF holder.

17. The mobile terminal of claim 15, wherein at least one area of the rear surface of the second PCB supports the front surfaces of the first holder and the second holder, and
    a reinforcement plate is provided on the rear surface of the second PCB to compensate for a difference in height between the first holder and the second holder.

18. The mobile terminal of claim 17, wherein at least a portion of a rear surface of the reinforcement plate supports the front surface of the second holder, and
    at least a portion of a side surface of the reinforcement plate supports a side surface of the first holder.

19. The mobile terminal of claim 15, wherein the second PCB forms an overlapping area in which at least one area of the second PCB is included in the first PCB, and the mobile terminal further comprises:
    a vertical partition configured to vertically connect the first PCB and the second PCB in the overlapping area; and
    a via formed in the vertical partition to electrically connect the first PCB and the second PCB.

20. The mobile terminal of claim 19, wherein the vertical partition is provided as a plurality of partitions, and at least a portion of the vertical partitions are shifted in a predetermined distance from an outer perimeter area of the rear surface of the second PCB.

\* \* \* \* \*